United States Patent
Sakai et al.

(10) Patent No.: US 12,139,583 B2
(45) Date of Patent: Nov. 12, 2024

(54) RESIN MOLDING

(71) Applicant: MITSUBISHI GAS CHEMICAL COMPANY, INC., Chiyoda-ku (JP)

(72) Inventors: Atsushi Sakai, Kanagawa (JP); Yuuki Sato, Kanagawa (JP)

(73) Assignee: MITSUBISHI GAS CHEMICAL COMPANY, INC., Chiyoda-ku (JP)

(*) Notice: Subject to any disclaimer, the term of this patent is extended or adjusted under 35 U.S.C. 154(b) by 784 days.

(21) Appl. No.: 17/050,871

(22) PCT Filed: May 8, 2019

(86) PCT No.: PCT/JP2019/018369
§ 371 (c)(1),
(2) Date: Oct. 27, 2020

(87) PCT Pub. No.: WO2019/220969
PCT Pub. Date: Nov. 21, 2019

(65) Prior Publication Data
US 2021/0230370 A1    Jul. 29, 2021

(30) Foreign Application Priority Data
May 17, 2018   (JP) .................... 2018-095749

(51) Int. Cl.
*C08G 73/14* (2006.01)
*B29C 45/00* (2006.01)
(Continued)

(52) U.S. Cl.
CPC .......... *C08G 73/14* (2013.01); *B29C 45/0001* (2013.01); *C08G 65/4012* (2013.01);
(Continued)

(58) Field of Classification Search
CPC ............ C08G 73/1042; C08G 2650/40; B29K 2071/00; C08L 79/08; C08L 71/10
See application file for complete search history.

(56) References Cited

U.S. PATENT DOCUMENTS

2014/0191263 A1* 7/2014 Wang ...................... C08L 67/02
524/413
2014/0200325 A1   7/2014 Sato et al.
(Continued)

FOREIGN PATENT DOCUMENTS

| JP | 7-133429 A | 5/1995 |
|---|---|---|
| JP | 2001139809 | * 5/2001 |

(Continued)

OTHER PUBLICATIONS

Masaru et al., electtronic translation of JP 2001139809 (May 2001).*

(Continued)

*Primary Examiner* — Mark S Kaucher
(74) *Attorney, Agent, or Firm* — Oblon, McClelland, Maier & Neustadt, L.L.P.

(57) ABSTRACT

A resin molded article having a microphase-separated structure, the resin molded article containing a polyimide resin (A) and a polyether ketone resin (B), the polyimide resin (A) containing repeating structural units of formulae (1) and (2):

(1)

(Continued)

-continued

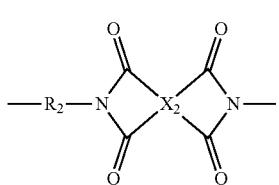

(2)

wherein $R_1$ represents a divalent group having from 6 to 22 carbon atoms containing at least one alicyclic hydrocarbon structure; $R_2$ represents a divalent chain aliphatic group having from 5 to 16 carbon atoms; and $X_1$ and $X_2$ each independently represent a tetravalent group having from 6 to 22 carbon atoms containing at least one aromatic ring, a content ratio of the repeating structural unit of formula (1) with respect to the total of the repeating structural unit of formula (1) and the repeating structural unit of formula (2) is 20 to 70 mol %, and a weight average molecular weight Mw is 40,000 to 150,000.

5 Claims, 4 Drawing Sheets

(51) Int. Cl.
| | |
|---|---|
| *C08G 65/40* | (2006.01) |
| *C08L 71/10* | (2006.01) |
| *C08L 79/08* | (2006.01) |
| *B29K 71/00* | (2006.01) |
| *B29K 79/00* | (2006.01) |

(52) U.S. Cl.
CPC ............... *C08L 71/10* (2013.01); *C08L 79/08* (2013.01); *B29K 2071/00* (2013.01); *B29K 2079/08* (2013.01); *B29K 2995/0012* (2013.01); *B29K 2995/0097* (2013.01); *C08G 2650/40* (2013.01)

(56) References Cited

U.S. PATENT DOCUMENTS

| | | | |
|---|---|---|---|
| 2017/0066884 A1* | 3/2017 | Koichi | ............... B01D 33/0392 |
| 2017/0130003 A1 | 5/2017 | Sato | |
| 2017/0275425 A1 | 9/2017 | Sato | |

FOREIGN PATENT DOCUMENTS

| | | |
|---|---|---|
| JP | 2005-28524 A | 2/2005 |
| JP | 2006-8986 A | 1/2006 |
| WO | WO 2013/118704 A1 | 8/2013 |
| WO | WO 2016/147996 A1 | 9/2016 |
| WO | WO 2016/147997 A1 | 9/2016 |

OTHER PUBLICATIONS

International Search Report issued on Jul. 16, 2019 in PCT/JP2019/018369 filed on May 8, 2019, 2 pages.

* cited by examiner

RESIN MOLDING

TECHNICAL FIELD

The present invention relates to a resin molded article. More specifically, the present invention relates to a resin molded article containing a thermoplastic polyimide resin and a polyether ketone resin.

BACKGROUND ART

A polyimide resin is a useful engineering plastic that has high thermal stability, high strength and high solvent resistance due to rigidity, resonance stabilization and firm chemical bond of the molecular chain thereof, and is being applied to a wide range of fields. A polyimide resin having crystallinity is further enhanced in the heat resistance, the strength and the chemical resistance thereof, and thus is expected for applications as alternatives of metals or the like. While a polyimide resin has high heat resistance, however, it has the problems of exhibiting no thermoplasticity and having low molding processability.

Vespel (registered trademark), a highly heat-resistant resin, is known as a polyimide molding material (PTL 1). This resin is difficult to process by molding due to its very low flowability even at a high temperature, and is also disadvantageous in terms of cost because it requires molding under conditions of a high temperature and a high pressure for a prolonged period of time. In contrast to this, a resin having a melting point and flowability at a high temperature, such as a crystalline resin, may be processed by molding easily and inexpensively.

Thus, a polyimide resin having thermoplasticity has been reported in recent years. Such a thermoplastic polyimide resin is excellent in molding processability in addition to the original heat resistance of the polyimide resin. The thermoplastic polyimide resin is therefore applicable to a molded article for use in an inhospitable environment to which nylon or polyester, a general purpose thermoplastic resin, is inapplicable.

For example, PTL 2 discloses a thermoplastic polyimide resin containing a predetermined repeating structural unit, wherein the resin is obtained by reacting a tetracarboxylic acid containing at least one aromatic ring and/or a derivative thereof, a diamine containing at least one alicyclic hydrocarbon structure, and a chain aliphatic diamine.

In the field of engineering plastics, there is also known a technique of compounding two or more thermoplastic resins to form an alloy for the purpose of improving physical properties and imparting functions according to an application. PTL 3 discloses a thermoplastic polyimide resin containing a predetermined repeating unit, and describes that the polyimide resin is used in combination with another resin as a polymer alloy.

CITATION LIST

Patent Literature

PTL 1: JP-A-2005-28524
PTL 2: WO2013/118704
PTL 3: WO2016/147996

SUMMARY OF INVENTION

Technical Problem

The physical properties required for engineering plastics vary greatly depending on the application and the usage environment of the product. For example, a high heat deformation temperature (HDT) may be mentioned as an index of having high heat resistance, but the HDT may also depend on the measured load. Products such as sliding members that are used under a high load environment are required to have high HDT under high load, and products that are used under a low load environment are required to have high HDT under a low load.

An object of the present invention is to provide a resin molded article that contains a polyimide resin, has a high heat deformation temperature particularly under a low load environment, and is excellent in heat resistance.

Solution to Problem

The present inventors have found that the aforementioned object can be attained by a resin molded article containing a polyimide resin in which particular different polyimide structural units are combined at a particular ratio and that has a weight average molecular weight in a particular range, and a polyether ketone resin.

That is, the present invention provides a resin molded article having a microphase-separated structure, the resin molded article containing a polyimide resin (A) and a polyether ketone resin (B), the polyimide resin (A) containing a repeating structural unit represented by the following formula (1) and a repeating structural unit represented by the following formula (2), a content ratio of the repeating structural unit of formula (1) with respect to the total of the repeating structural unit of formula (1) and the repeating structural unit of formula (2) being 20 to 70 mol %, and a weight average molecular weight Mw being 40,000 to 150,000.

wherein $R_1$ represents a divalent group having from 6 to 22 carbon atoms containing at least one alicyclic hydrocarbon structure; $R_2$ represents a divalent chain aliphatic group having from 5 to 16 carbon atoms; and $X_1$ and $X_2$ each independently represent a tetravalent group having from 6 to 22 carbon atoms containing at least one aromatic ring.

Advantageous Effects of Invention

The resin molded article of the present invention has a high heat deformation temperature particularly under a low load environment and is excellent in heat resistance, and therefore can be applied in, for example, speaker diaphragms, protective covers, transportation cassettes, test sockets, UD tapes, CFRP members, and the like.

DESCRIPTION OF EMBODIMENTS

[Resin Molded Article]

The resin molded article of the present invention has a microphase-separated structure, and contains a polyimide resin (A) and a polyether ketone resin (B). The polyimide resin (A) contains a repeating structural unit represented by the following formula (1) and a repeating structural unit represented by the following formula (2). A content ratio of the repeating structural unit of formula (1) with respect to the total of the repeating structural unit of formula (1) and the repeating structural unit of formula (2) being 20 to 70 mol %, and a weight average molecular weight Mw being 40,000 to 150,000.

wherein $R_1$ represents a divalent group having from 6 to 22 carbon atoms containing at least one alicyclic hydrocarbon structure; $R_2$ represents a divalent chain aliphatic group having from 5 to 16 carbon atoms; and $X_1$ and $X_2$ each independently represent a tetravalent group having from 6 to 22 carbon atoms containing at least one aromatic ring.

The resin molded article of the present invention contains a polyimide resin (A) and a polyether ketone resin (B), and further has a microphase-separated structure. The polyimide resin (A) is constructed by the structure that particular different polyimide structural units are combined at the above particular ratio, and has a weight average molecular weight Mw of from 40,000 to 150,000. As a result of this, the heat deformation temperature (HDT) under a low load environment is significantly enhanced as compared with the heat deformation temperature of (A) or (B) alone. Although the reason for this is not clear, it is thought to be due to the fact that when the weight average molecular weight Mw of the polyimide resin (A) having a specific structure is 40,000 or more, the polyimide resin (A) and the polyether ketone resin (B) tend to form a microphase-separated structure. As a result, it is thought that the resin molded article of the present invention can have different physical properties from those of a resin molded article consisting only of the polyimide resin (A) and a resin molded article consisting only of the polyether ketone resin (B).

The HDT of a thermoplastic resin generally exhibits similar behavior under a low load environment and a high load environment. However, the HDT of the resin molded article of the present invention behaves differently under a low load environment and a high load environment, and particularly under a low load environment the HDT specifically increases. Therefore, for example, even when a resin molded article is produced by compounding another thermoplastic resin with the polyimide resin (A) instead of the polyether ketone resin (B), the same effects as the present invention may not always be obtained.

In the present specification, "HDT under a low load environment" refers to the HDT measured under load conditions of 0.45 MPa, and "HDT under a high load environment" refers to the HDT measured under load conditions of 1.80 MPa. The HDT can be specifically measured by the method described in the examples.

<Polyimide Resin (A)>

The polyimide resin (A) used in the present invention contains a repeating structural unit represented by the following formula (1) and a repeating structural unit represented by the following formula (2), a content ratio of the repeating structural unit of the formula (1) with respect to the total of the repeating structural unit of the formula (1) and the repeating structural unit of the formula (2) being 20 to 70 mol %:

wherein $R_1$ represents a divalent group having from 6 to 22 carbon atoms containing at least one alicyclic hydrocarbon structure; $R_2$ represents a divalent chain aliphatic group having from 5 to 16 carbon atoms; and $X_1$ and $X_2$ each independently represent a tetravalent group having from 6 to 22 carbon atoms containing at least one aromatic ring.

The polyimide resin (A) used in the present invention is a thermoplastic resin, which is preferably in a powder or pellet form. The thermoplastic polyimide resin is distinguished from, for example, polyimide resins formed by closing the imide ring after shaping in a state of a polyimide precursor such as a polyamic acid and having no glass transition temperature (Tg), or polyimide resins that decompose at a temperature lower than the glass transition temperature.

The repeating structural unit of formula (1) will be described in detail below.

$R_1$ represents a divalent group having from 6 to 22 carbon atoms containing at least one alicyclic hydrocarbon structure. The alicyclic hydrocarbon structure herein means a ring derived from an alicyclic hydrocarbon compound, and the alicyclic hydrocarbon compound may be either saturated or unsaturated and may be either monocyclic or polycyclic.

Examples of the alicyclic hydrocarbon structure include a cycloalkane ring, such as a cyclohexane ring, a cycloalkene ring, such as cyclohexene, a bicycloalkane ring, such as a norbornane ring, and a bicycloalkene ring, such as norbornene, but the alicyclic hydrocarbon structure is not limited thereto. Among these, a cycloalkane ring is preferred, a cycloalkane ring having from 4 to 7 carbon atoms is more preferred, and a cyclohexane ring is further preferred.

$R_1$ has from 6 to 22 carbon atoms, and preferably from 8 to 17 carbon atoms.

$R_1$ contains at least one alicyclic hydrocarbon structure, and preferably from 1 to 3 alicyclic hydrocarbon structures.

$R_1$ is preferably a divalent group represented by the following formula (R1-1) or (R1-2):

(R1-1)

(R1-2)

wherein $m_{11}$ and $m_{12}$ each independently represent an integer of 0-2, and preferably 0 or 1; and $m_{13}$ to $m_{15}$ each independently represent an integer of 0-2, and preferably 0 or 1.

$R_1$ is particularly preferably a divalent group represented by the following formula (R1-3):

(R1-3)

In the divalent group represented by the formula (R1-3), the conformation of the two methylene groups with respect to the cyclohexane ring may be either cis or trans, and the ratio of cis and trans may be an arbitrary value.

$X_1$ is a tetravalent group having from 6 to 22 carbon atoms containing at least one aromatic ring. The aromatic ring may be either a monocyclic ring or a condensed ring, and examples thereof include a benzene ring, a naphthalene ring, an anthracene ring and a tetracene ring, but the aromatic ring is not limited thereto. Among these, a benzene ring and a naphthalene ring are preferred, and a benzene ring is more preferred.

$X_1$ has from 6 to 22 carbon atoms, and preferably has from 6 to 18 carbon atoms.

$X_1$ contains at least one aromatic ring, and preferably contains from 1 to 3 aromatic rings.

$X_1$ is preferably a tetravalent group represented by one of the following formulae (X-1) to (X-4):

(X-1)

(X-2)

(X-3)

(X-4)

wherein $R_{11}$ to $R_{18}$ each independently represent an alkyl group having from 1 to 4 carbon atoms; $p_{11}$ to $p_{13}$ each independently represent an integer of 0-2, and preferably 0; $p_{14}$, $p_{15}$, $p_{16}$ and $p_{18}$ each independently represent an integer of 0-3, and preferably 0; $p_{17}$ represents an integer of 0-4, and preferably 0; and $L_{11}$ to $L_{13}$ each independently represent a single bond, an ether group, a carbonyl group or an alkylene group having from 1 to 4 carbon atoms.

$X_1$ is a tetravalent group having from 6 to 22 carbon atoms containing at least one aromatic ring, and therefore $R_{12}$, $R_{13}$, $p_{12}$ and $p_{13}$ in the formula (X-2) are selected in such a manner that the tetravalent group represented by the formula (X-2) has from 10 to 22 carbon atoms.

Similarly, $L_{11}$, $R_{14}$, $R_{15}$, $p_{14}$ and $p_{15}$ in the formula (X-3) are selected in such a manner that the tetravalent group represented by the formula (X-3) has from 12 to 22 carbon atoms, and $L_{12}$, $L_{13}$, $R_{16}$, $R_{17}$, $R_{18}$, $p_{16}$, $p_{17}$ and $p_{18}$ in the formula (X-4) are selected in such a manner that the tetravalent group represented by the formula (X-4) has from 18 to 22 carbon atoms.

$X_1$ is particularly preferably a tetravalent group represented by the following formula (X-5) or (X-6):

(X-5)

(X-6)

Next, the repeating structural unit of formula (2) will be described in detail below.

$R_2$ represents a divalent chain aliphatic group having from 5 to 16 carbon atoms, preferably from 6 to 14 carbon atoms, more preferably from 7 to 12 carbon atoms, and further preferably from 8 to 10 carbon atoms. The chain aliphatic group herein means a group derived from a chain aliphatic compound, and the chain aliphatic compound may be either saturated or unsaturated, may be in the form of either linear or branched chain, and may contain a hetero atom, such as an oxygen atom.

$R_2$ is preferably an alkylene group having from 5 to 16 carbon atoms, more preferably an alkylene group having from 6 to 14 carbon atoms, further preferably an alkylene group having from 7 to 12 carbon atoms, and particularly preferably an alkylene group having from 8 to 10 carbon atoms. The alkylene group may be either a linear alkylene group or a branched alkylene group, and is preferably a linear alkylene group.

$R_2$ preferably represents at least one selected from the group consisting of an octamethylene group and a decamethylene group, and particularly preferably represents an octamethylene group.

Another preferred embodiment of $R_2$ is a divalent chain aliphatic group having from 5 to 16 carbon atoms containing an ether group. The divalent chain aliphatic group preferably has from 6 to 14 carbon atoms, more preferably from 7 to 12 carbon atoms, and further preferably from 8 to 10 carbon atoms. Preferred examples of the group include a divalent group represented by the following formula (R2-1) or (R2-2):

$$-(CH_2)_{m21}-O-(CH_2)_{m22}- \quad (R2\text{-}1)$$

$$-(CH_2)_{m23}-O-(CH_2)_{m24}-O-(CH_2)_{m25}- \quad (R2\text{-}2)$$

wherein $m_{21}$ and $m_{22}$ each independently represent an integer of 1-15, preferably 1-13, more preferably 1-11, and further preferably 1-9; and $m_{23}$ to $m_{25}$ each independently represent an integer of 1-14, preferably 1-12, more preferably 1-10, and further preferably 1-8.

$R_2$ represents a divalent chain aliphatic group having from 5 to 16 carbon atoms (preferably from 6 to 14 carbon atoms, more preferably from 7 to 12 carbon atoms, and further preferably from 8 to 10 carbon atoms), and therefore $m_{21}$ and $m_{22}$ in the formula (R2-1) are selected so that the divalent group represented by the formula (R2-1) has from 5 to 16 carbon atoms (preferably from 6 to 14 carbon atoms, more preferably from 7 to 12 carbon atoms, and further preferably from 8 to 10 carbon atoms), i.e., $m_{21}+m_{22}$ is from 5 to 16 (preferably 6 to 14, more preferably 7 to 12, and further preferably 8 to 10).

Similarly, $m_{23}$ to $m_{25}$ in the formula (R2-2) are selected so that the divalent group represented by the formula (R2-2) has from 5 to 16 carbon atoms (preferably from 6 to 14 carbon atoms, more preferably from 7 to 12 carbon atoms, and further preferably from 8 to 10 carbon atoms), i.e., $m_{23}+m_{24}+m_{25}$ is from 5 to 16 (preferably from 6 to 14 carbon atoms, more preferably from 7 to 12 carbon atoms, and further preferably from 8 to 10 carbon atoms).

$X_2$ is defined similarly to $X_1$ in the formula (1), and preferred embodiments thereof are also the same.

The content ratio of the repeating structural unit of the formula (1) with respect to the total of the repeating structural unit of the formula (1) and the repeating structural unit of the formula (2) is 20 mol % to 70 mol %. In the case where the content ratio of the repeating structural unit of the formula (1) is in the above range, the polyimide resin may also be sufficiently crystallized in an ordinary injection molding cycle. When the content ratio is less than 20 mol %, molding processability is deteriorated, and when the content ratio is more than 70 mol %, crystallinity is deteriorated to thereby result in deterioration in heat resistance.

The content ratio of the repeating structural unit of the formula (1) with respect to the total of the repeating structural unit of the formula (1) and the repeating structural unit of the formula (2) is preferably 65 mol % or less, more preferably 60 mol % or less, and further preferably 50 mol % or less in consideration of exerting high crystallinity.

Among these, the content ratio of the repeating structural unit of the formula (1) with respect to the total of the repeating structural unit of the formula (1) and the repeating structural unit of the formula (2) is preferably 20 mol % or more and less than 40 mol %. Within this range, the crystallinity of the polyimide resin (A) increases, and a resin molded article having even better heat resistance can be obtained.

The content ratio described above is preferably 25 mol % or more, more preferably 30 mol % or more, further preferably 32 mol % or more in consideration of molding processability, and is further preferably 35 mol % or less in consideration of exerting high crystallinity.

The content ratio of the total of the repeating structural unit of the formula (1) and the repeating structural unit of the formula (2) with respect to the total repeating units constituting the polyimide resin (A) is preferably 50 to 100 mol %, more preferably 75 to 100 mol %, further preferably 80 to 100 mol %, and still further preferably 85 to 100 mol %.

The polyimide resin (A) may further contain a repeating structural unit represented by the following formula (3). In this case, the content ratio of the repeating structural unit of formula (3) with respect to the total of the repeating structural unit of formula (1) and the repeating structural unit of formula (2) is preferably 25 mol % or less. The lower limit thereof is not particularly limited but needs to exceed 0 mol %.

The content ratio is preferably 5 mol % or more, and more preferably 10 mol % or more, in consideration of enhancement of the heat resistance, and is preferably 20 mol % or less, and more preferably 15 mol % or less, in consideration of maintenance of the crystallinity.

(3)

wherein $R_3$ represents a divalent group having from 6 to 22 carbon atoms containing at least one aromatic ring; and $X_3$ represents a tetravalent group having from 6 to 22 carbon atoms containing at least one aromatic ring.

- $R_3$ is a divalent group having from 6 to 22 carbon atoms containing at least one aromatic ring. The aromatic ring may be either a monocycic ring or a condensed ring, and examples thereof include a benzene ring, a naphthalene ring, an anthracene ring and a tetracene ring, but the aromatic ring is not limited thereto. Among these, a benzene ring and a naphthalene ring are preferred, and a benzene ring is more preferred.
- $R_3$ has from 6 to 22 carbon atoms, and preferably has from 6 to 18 carbon atoms.
- $R_3$ contains at least one aromatic ring, and preferably contains from 1 to 3 aromatic rings.

The aromatic ring may also be bonded to a monovalent or divalent electron-attracting group. Examples of the monovalent electron-attracting group include a nitro group, a cyano group, a p-toluenesulfonyl group, halogen, an alkyl halide group, a phenyl group, and an acyl group. Examples of the divalent electron-attracting group include alkylene halide groups such as alkylene fluoride groups (e.g., —C(CF$_3$)$_2$— and —(CF$_2$)$_p$— (wherein p is an integer of 1-10), as well as —CO—, —SO$_2$—, —SO—, —CONH—, and —COO—.

- $R_3$ is preferably a divalent group represented by the following formula (R3-1) or (R3-2):

wherein $m_{31}$ and $m_{32}$ each independently represent an integer of 0-2, and preferably 0 or 1; $m_{33}$ and $m_{34}$ each independently represent an integer of 0-2, and preferably 0 or 1; $R_{21}$, $R_{22}$ and $R_{23}$ each independently represent an alkyl group having from 1 to 4 carbon atoms, an alkenyl group having from 2 to 4 carbon atoms or an alkynyl group having from 2 to 4 carbon atoms; $p_{21}$, $p_{22}$ and $p_{23}$ each represent an integer of 0-4, and preferably 0; and $L_{21}$ represents a single bond, an ether group, a carbonyl group or an alkylene group having from 1 to 4 carbon atoms.

- $R_3$ is a divalent group having from 6 to 22 carbon atoms containing at least one aromatic ring, and therefore $m_{31}$, $m_{32}$, $R_{21}$ and $p_{21}$ in the formula (R3-1) are selected in such a manner that the divalent group represented by the formula (R3-1) has from 6 to 22 carbon atoms.
- Similarly, $L_{21}$, $m_{33}$, $m_{34}$, $R_{22}$, $R_{23}$, $p_{22}$ and $p_{23}$ in the formula (R3-2) are selected in such a manner that the divalent group represented by the formula (R3-2) has from 12 to 22 carbon atoms.
- $X_3$ is defined similarly to $X_1$ in the formula (1), and preferred embodiments thereof are also the same.

The polyimide resin (A) may further contain a repeating structural unit represented by the following formula (4):

wherein $R_4$ represents a divalent group containing —SO$_2$— or —Si(R$_x$)(R$_y$)O—; $R_x$ and $R_y$ each independently represent a chain aliphatic group having from 1 to 3 carbon atoms, or a phenyl group; and $X_4$ represents a tetravalent group having from 6 to 22 carbon atoms containing at least one aromatic ring.

$X_4$ is defined similarly to $X_1$ in the formula (1), and preferred embodiments thereof are also the same.

The end structure of the polyimide resin (A) is not particularly limited, and preferably has a chain aliphatic group having 5 to 14 carbon atoms at the end thereof.

The chain aliphatic group may be either saturated or unsaturated, and may be in the form of either linear or branched chain. When the polyimide resin (A) has the specific group described above at the end, a resin molded article having excellent heat aging resistance can be obtained.

Example of the saturated chain aliphatic group having from 5 to 14 carbon atoms include an n-pentyl group, an n-hexyl group, an n-heptyl group, an n-octyl group, an n-nonyl group, an n-decyl group, an n-undecyl group, a lauryl group, an n-tridecyl group, an n-tetradecyl group, an isopentyl group, a neopentyl group, a 2-methylpentyl group, a 2-methylhexyl group, a 2-ethylpentyl group, a 3-ethylpentyl group, an isooctyl group, a 2-ethylhexyl group, a 3-ethylhexyl group, an isononyl group, a 2-ethyloctyl group, an isodecyl group, an isododecyl group, an isotridecyl group and an isotetradecyl group.

Example of the unsaturated chain aliphatic group having from 5 to 14 carbon atoms include a 1-pentenyl group, a 2-pentenyl group, a 1-hexenyl group, a 2-hexenyl group, a 1-heptenyl group, a 2-heptenyl group, a 1-octenyl group, a 2-octenyl group, a nonenyl group, a decenyl group, a dodecenyl group, a tridecenyl group and a tetradecenyl group.

Among these, the chain aliphatic group is preferably a saturated chain aliphatic group, and more preferably a saturated linear aliphatic group. The chain aliphatic group preferably has 6 or more carbon atoms, more preferably 7 or more carbon atoms and further preferably 8 or more carbon atoms, and preferably has 12 or less carbon atoms, more preferably 10 or less carbon atoms and further preferably 9 or less carbon atoms in consideration of achievement of heat aging resistance. The chain aliphatic group may be adopted singly or in combinations of two or more.

The chain aliphatic group is particularly preferably at least one selected from the group consisting of an n-octyl group, an isooctyl group, a 2-ethylhexyl group, an n-nonyl group, an isononyl group, an n-decyl group and an isodecyl group, further preferably at least one selected from the group consisting of an n-octyl group, an isooctyl group, a 2-ethylhexyl group, an n-nonyl group, and an isononyl group, and most preferably at least one selected from the group consisting of an n-octyl group, an isooctyl group, and a 2-ethylhexyl group.

The polyimide resin (A) preferably contains only a chain aliphatic group having from 5 to 14 carbon atoms, besides a terminal amino group and a terminal carboxy group, at the end thereof in consideration of heat aging resistance. When a group, besides the above groups, is contained at the end, the content thereof with respect to the chain aliphatic group having from 5 to 14 carbon atoms is preferably 10 mol % or less and more preferably 5 mol % or less.

The content of the chain aliphatic group having from 5 to 14 carbon atoms in the polyimide resin (A) is preferably 0.01 mol % or more, more preferably 0.1 mol % or more, and further preferably 0.2 mol % or more based on the total 100 mol % of the total repeating structural units constituting the polyimide resin (A) in consideration of exerting excellent heat aging resistance. In order to secure a sufficient molecular weight and obtain good mechanical properties, the content of the chain aliphatic group having from 5 to 14 carbon atoms in the polyimide resin (A) is, with respect to a total of 100 mol % of all the repeating structural units constituting the polyimide resin (A), preferably 10 mol % or less, more preferably 6 mol % or less, further preferably 3.5 mol % or less, still further preferably 2.0 mol % or less, and even still further preferably 1.2 mol % or less.

The content of the chain aliphatic group having from 5 to 14 carbon atoms in the polyimide resin (A) can be determined by depolymerization of the polyimide resin (A).

The polyimide resin (A) preferably has a melting point of 360° C. or less and a glass transition temperature of 150° C. or more. The melting point of the polyimide resin (A) is more preferably 280° C. or more and further preferably 290° C. or more in consideration of heat resistance, and is preferably 345° C. or less, more preferably 340° C. or less, and further preferably 335° C. or less in consideration of exerting high molding processability. In addition, the glass transition temperature of the polyimide resin (A) is more preferably 160° C. or more and more preferably 170° C. or more in consideration of heat resistance, and is preferably 250° C. or less, more preferably 230° C. or less, and further preferably 200° C. or less in consideration of exerting high molding processability.

Both the melting point and the glass transition temperature of the polyimide resin can be measured by a differential scanning calorimeter.

In addition, in the polyimide resin (A), the exothermic amount (hereinafter, also simply referred to as "exothermic amount of crystallization") of the crystallization exothermic peak observed in melting and then cooling of the polyimide resin at a cooling rate of 20° C./min with differential scanning calorimetric measurement is preferably 5.0 mJ/mg or more, more preferably 10.0 mJ/mg or more, and further preferably 17.0 mJ/mg or more in consideration of enhancement of crystallinity, heat resistance, mechanical strength, and chemical resistance. The upper limit of the exothermic amount of crystallization is not particularly limited, and is usually 45.0 mJ/mg or less.

The melting point, the glass transition temperature, and the exothermic amount of crystallization of the polyimide resin can be specifically measured by the methods described in the examples.

The weight average molecular weight Mw of the polyimide resin (A) is in the range of 40,000 to 150,000, preferably 40,000 to 100,000, more preferably 42,000 to 80,000, further preferably 45,000 to 70,000, and still further preferably 45,000 to 65,000. When the weight average molecular weight Mw of the polyimide resin (A) is 40,000 or more, a microphase-separated structure tends to be formed in the resin molded article, HDT is enhanced under a low load environment, and mechanical strength is also good. When Mw is 150,000 or less, molding processability is good.

The weight average molecular weight Mw of the polyimide resin (A) can be measured by gel filtration chromatography (GPC) using polymethyl methacrylate (PMMA) as a standard sample.

The logarithmic viscosity of the polyimide resin (A) at 30° C. in a 5 mass % concentrated sulfuric acid solution is preferably in the range of 0.8 to 2.0 dL/g, and more preferably 0.9 to 1.8 dL/g. When the logarithmic viscosity is 0.8 dl/g or more, a microphase-separated structure tends to be formed in the obtained resin molded article, and sufficient mechanical strength can be obtained. When the logarithmic viscosity is 2.0 dL/g or less, molding processability and handleability are good. The logarithmic viscosity p is obtained according to the following expression by measuring the elapsed times for flowing concentrated sulfuric acid and the polyimide resin solution at 30° C. with a Cannon-Fenske viscometer.

$\mu = \ln(t_s/t_0)/C$ $t_0$: elapsed time for flowing concentrated sulfuric acid
$t_s$: elapsed time for flowing polyimide resin solution
C: 0.5 (g/dL)

(Method for Producing Polyimide Resin (A))

The polyimide resin (A) may be produced by reacting a tetracarboxylic acid component and a diamine component. The tetracarboxylic acid component contains a tetracarboxylic acid containing at least one aromatic ring and/or a derivative thereof, and the diamine component contains a diamine containing at least one alicyclic hydrocarbon structure and a chain aliphatic diamine.

The tetracarboxylic acid containing at least one aromatic ring is preferably a compound having four carboxy groups that are bonded directly to the aromatic ring, and may contain an alkyl group in the structure thereof. The tetracarboxylic acid preferably has from 6 to 26 carbon atoms. Preferred examples of the tetracarboxylic acid include pyromellitic acid, 2,3,5,6-toluenetetracarboxylic acid, 3,3',4,4'-benzophenonetetracarboxylic acid, 3,3',4,4'-biphenyltetracarboxylic acid and 1,4,5,8-naphthalenetetracarboxylic acid. Among these, pyromellitic acid is more preferred.

Examples of the derivative of the tetracarboxylic acid containing at least one aromatic ring include an anhydride and an alkyl ester compound of a tetracarboxylic acid containing at least one aromatic ring. The derivative of the tetracarboxylic acid preferably has from 6 to 38 carbon atoms. Examples of the anhydride of the tetracarboxylic acid include pyromellitic monoanhydride, pyromellitic dianhydride, 2,3,5,6-toluenetetracarboxylic dianhydride, 3,3',4,4'-diphenylsulfonetetracarboxylic dianhydride, 3,3',4,4'-benzophenonetetracarboxylic dianhydride, 3,3',4,4'-biphenyltetracarboxylic dianhydride and 1,4,5,8-naphthalenetetracarboxylic dianhydride. Examples of the alkyl ester compound of the tetracarboxylic acid include dimethyl pyromellitate, diethyl pyromellitate, dipropyl pyromellitate, diisopropyl pyromellitate, dimethyl 2,3,5,6-toluenetetracarboxylate, dimethyl 3,3',4,4'-diphenylsulfonetetracarboxylate, dimethyl 3,3',4,4'-benzophenonetetracarboxylate, dimethyl 3,3',4,4'-biphenyltetracarboxylate and dimethyl 1,4,5,8-naphthalenetetracarboxylate. The alkyl group in the alkyl ester compound of the tetracarboxylic acid preferably has from 1 to 3 carbon atoms.

The tetracarboxylic acid containing at least one aromatic ring and/or the derivative thereof may be used as a sole compound selected from the aforementioned compounds or may be used as a combination of two or more compounds.

The diamine containing at least one alicyclic hydrocarbon structure preferably has from 6 to 22 carbon atoms, and preferred examples thereof include 1,2-bis(aminomethyl)cyclohexane, 1,3-bis(aminomethyl)cyclohexane, 1,4-bis(aminomethyl)cyclohexane, 1,2-cyclohexanediamine, 1,3-cyclohexanediamine, 1,4-cyclohexanediamine, 4,4'-diaminodicyclohexylmethane, 4,4'-methylenebis(2-methylcyclohexylamine), carvone diamine, limonene diamine, isophorone diamine, norbornane diamine, bis(aminomethyl)tricyclo[5.2.1.0$^{2,6}$]decane, 3,3'-dimethyl-4,4'-diaminodicyclohexylmethane and 4,4'-diaminodicyclohexylpropane. These compounds may be used solely or may be used as a combination of two or more compounds selected therefrom. Among these, 1,3-bis(aminomethyl)cyclohexane is preferably used. A diamine containing an alicyclic hydrocarbon structure generally has conformational isomers, and the ratio of the cis isomer and the trans isomer is not particularly limited.

The chain aliphatic diamine may be in the form of either linear or branched chain, and has preferably from 5 to 16 carbon atoms, more preferably from 6 to 14 carbon atoms and further preferably from 7 to 12 carbon atoms. The linear moiety having from 5 to 16 carbon atoms may contain an ether bond in the course thereof. Preferred examples of the chain aliphatic diamine include 1,5-pentamethylenediamine, 2-methylpentane-1,5-diamine, 3-methylpentane-1,5-diamine, 1,6-hexamethylenediamine, 1,7-heptamethylenediamine, 1,8-octamethylenediamine, 1,9-nonamethylenediamine, 1,10-decamethylenediamine, 1,11-undecamethylenediamine, 1,12-dodecamethylenediamine, 1,13-tridecamethylenediamine, 1,14-tetradecamethylenediamine, 1,16-hexadecamethylenediamine, and 2,2'-(ethylenedioxy)bis(ethyleneamine).

The chain aliphatic diamine may be used as a sole compound or as a mixture of plural kinds thereof. Among these, a chain aliphatic diamine having from 8 to 10 carbon atoms can be preferably used, and at least one selected from the group consisting of 1,8-octamethylenediamine and 1,10-decamethylenediamine can be particularly preferably used.

In the production of the polyimide resin (A), the molar ratio of the charged amount of the diamine containing at least one alicyclic hydrocarbon structure with respect to the total amount of the diamine containing at least one alicyclic hydrocarbon structure and the chain aliphatic diamine is preferably 20 to 70 mol %. The molar ratio is preferably 25 mol % or more, more preferably 30 mol % or more, further preferably 32 mol % or more, and is preferably 60 mol % or less, more preferably 50 mol % or less, further preferably less than 40 mol, and further preferably 35 mol % or less in consideration of exerting high crystallinity.

The diamine component may contain a diamine containing at least one aromatic ring. The diamine containing at least one aromatic ring preferably has from 6 to 22 carbon atoms, and examples thereof include o-xylylenediamine, m-xylylenediamine, p-xylylenediamine, 1,2-diethynylbenzenediamine, 1,3-diethynylbenzenediamine, 1,4-diethynylbenzenediamine, 1,2-diaminobenzene, 1,3-diaminobenzene, 1,4-diaminobenzene, 4,4'-diaminodiphenyl ether, 3,4'-diaminodiphenyl ether, 4,4'-diaminodiphenylmethane, α,α'-bis(4-aminophenyl)-1,4-diisopropylbenzene, α,α'-bis(3-aminophenyl)-1,4-diisopropylbenzene, 2,2-bis(4-(4-aminophenoxy)phenyl)propane, 2,6-diaminonaphthalene and 1,5-diaminonaphthalene.

The molar ratio of the charged amount of the diamine containing at least one aromatic ring with respect to the total amount of the diamine containing at least one alicyclic hydrocarbon structure and the chain aliphatic diamine is preferably 25 mol % or less. The lower limit thereof is not particularly limited but needs to exceed 0 mol %.

The molar ratio is preferably 5 mol % or more, and more preferably 10 mol % or more, in consideration of enhancement of the heat resistance, and is preferably 20 mol % or less, and more preferably 15 mol % or less, in consideration of maintenance of the crystallinity.

In addition, the molar ratio is preferably 12 mol % or less, more preferably 10 mol % or less, further preferably 5 mol % or less and still more preferably 0 mol % in consideration of a decrease in coloration of the polyimide resin.

In the production of the polyimide resin (A), the charged amount ratio of the tetracarboxylic acid component and the diamine component is preferably from 0.9 to 1.1 mol of the diamine component per 1 mol of the tetracarboxylic acid component.

In the production of the polyimide resin (A), an end capping agent may be mixed in addition to the tetracarboxylic acid component and the diamine component. The end capping agent is preferably at least one selected from the group consisting of a monoamine compound and a dicarboxylic acid compound.

The amount of the end capping agent to be used may be any amount as long as a desired amount of an end group can be introduced into the polyimide resin (A), and the amount is preferably 0.0001 to 0.1 mol, more preferably 0.001 to 0.06 mol, further preferably 0.002 to 0.035 mol, still further preferably 0.002 to 0.020 mol, and even still further preferably 0.002 to 0.012 mol, per 1 mol of the tetracarboxylic acid and/or the derivative thereof.

Examples of the monoamine end capping agent include methylamine, ethylamine, propylamine, butylamine, n-pentylamine, n-hexylamine, n-heptylamine, n-octylamine, n-nonylamine, n-decylamine, n-undecylamine, laurylamine, n-tridecylamine, n-tetradecylamine, isopentylamine, neopentylamine, 2-methylpentylamine, 2-methylhexylamine, 2-ethylpentylamine, 3-ethylpentylamine, isooctylamine, 2-ethylhexylamine, 3-ethylhexylamine, isononylamine, 2-ethyloctylamine, isodecylamine, isododecylamine, isotridecylamine, isotetradecylamine, benzylamine, 4-methylbenzylamine, 4-ethylbenzylamine, 4-dodecylbenzylamine, 3-methylbenzylamine, 3-ethylbenzylamine, aniline, 3-methylaniline and 4-methylaniline.

The dicarboxylic acid end capping agent is preferably a dicarboxylic acid compound, which may partially have a closed ring structure. Examples thereof include phthalic acid, phthalic anhydride, 4-chlorophthalic acid, tetrafluorophthalic acid, 2,3-benzophenonedicarboxylic acid, 3,4-benzophenonedicarboxylic acid, cyclohexane-1,2-dicarboxylic acid, cyclopentane-1,2-dicarboxylic acid and 4-cyclohexene-1,2-dicarboxylic acid. Among these, phthalic acid and phthalic anhydride are preferred.

Such an end capping agent may be used singly or in combinations of two or more.

Among these, the monoamine end capping agent is preferable, and a monoamine containing a chain aliphatic group having from 5 to 14 carbon atoms is more preferable and a monoamine containing a saturated linear aliphatic group having from 5 to 14 carbon atoms is further preferable in consideration of introduction of the chain aliphatic group having from 5 to 14 carbon atoms into the end of the polyimide resin (A) for enhancement of heat aging resistance. The chain aliphatic group preferably has 6 or more carbon atoms, more preferably has 7 or more carbon atoms and further preferably has 8 or more carbon atoms, and preferably has 12 or less carbon atoms, more preferably has 10 or less carbon atoms and further preferably has 9 or less carbon atoms. A monoamine containing a chain aliphatic group having 5 or more carbon atoms is preferable because of being hardly volatilized in production of the polyimide resin (A).

The end capping agent is particularly preferably at least one selected from the group consisting of n-octylamine, isooctylamine, 2-ethylhexylamine, n-nonylamine, isononylamine, n-decylamine, and isodecylamine, further preferably at least one selected from the group consisting of n-octylamine, isooctylamine, 2-ethylhexylamine, n-nonylamine, and isononylamine, and most preferably at least one selected from the group consisting of n-octylamine, isooctylamine, and 2-ethylhexylamine.

As a polymerization method for producing the polyimide resin (A), a known polymerization method may be applied, and examples thereof include, for example, solution polymerization, melt polymerization, solid phase polymerization, suspension polymerization and the like while not particularly limited. Among these, suspension polymerization under a high temperature condition using an organic solvent is preferred. On performing suspension polymerization under a high temperature condition, the polymerization is preferably performed at 150° C. or more, and more preferably at from 180 to 250° C. The polymerization time may vary depending on the monomers used, and is preferably approximately from 0.1 to 6 hours.

The method for producing the polyimide resin (A) preferably includes the step of reacting the tetracarboxylic acid component with the diamine component in the presence of a solvent containing an alkylene glycol-based solvent represented by the following formula (I). In this way, the polyimide resin excellent in handleability may be obtained in a powder form:

$$R_{a1}\text{—}O\text{—}(R_{a2}\text{—}O)_{\overline{n}}\text{H} \quad (I)$$

wherein $Ra_1$ represents a hydrogen atom or an alkyl group having from 1 to 4 carbon atoms; $Ra_2$ represents a linear alkylene group having from 2 to 6 carbon atoms; and n represents an integer of 1-3.

In order to obtain a homogeneous powder polyimide resin, it is considered to be desirable that the solvent in a one-pot reaction possess two properties of (1) homogeneously dissolving a polyamic acid or homogeneously dispersing a nylon salt, and (2) not dissolving and swelling the polyimide resin at all. A solvent containing the alkylene glycol-based solvent represented by the formula (I) generally satisfies the two properties.

The alkylene glycol-based solvent has a boiling point of preferably 140° C. or more, more preferably 160° C. or more, and further preferably 180° C. or more, in consideration of feasible polymerization reaction under high temperature conditions at normal pressure.

In the formula (I), $Ra_1$ represents a hydrogen atom or an alkyl group having from 1 to 4 carbon atoms and is preferably an alkyl group having from 1 to 4 carbon atoms, and more preferably a methyl group or an ethyl group.

In the formula (I), $Ra_2$ represents a linear alkylene group having from 2 to 6 carbon atoms and is preferably a linear alkylene group having 2 or 3 carbon atoms, and more preferably an ethylene group.

In the formula (I), n represents an integer of 1-3 and is preferably 2 or 3.

Specific examples of the alkylene glycol-based solvent include ethylene glycol monomethyl ether, diethylene glycol monomethyl ether (also known as 2-(2-methoxyethoxy) ethanol), triethylene glycol monomethyl ether, ethylene glycol monoethyl ether, diethylene glycol monoethyl ether (also known as 2-(2-ethoxyethoxy)ethanol), ethylene glycol monoisopropyl ether, diethylene glycol monoisopropyl ether, triethylene glycol monoisopropyl ether, ethylene glycol monobutyl ether, diethylene glycol monobutyl ether, triethylene glycol monobutyl ether, ethylene glycol monoisobutyl ether, diethylene glycol monoisobutyl ether, ethylene glycol monoisobutyl ether, ethylene glycol, and 1,3-propanediol. These solvents may each be used alone, or two or more solvents selected from them may be used in combination. Among these solvents, 2-(2-methoxyethoxy) ethanol, triethylene glycol monomethyl ether, 2-(2-ethoxyethoxy)ethanol, and 1,3-propanediol are preferred, and 2-(2-methoxyethoxy)ethanol and 2(2-ethoxyethoxy)ethanol are more preferred.

The content of the alkylene glycol-based solvent in the solvent is preferably 30 mass % or more, more preferably 50 mass % or more, further preferably 75 mass % or more, and further preferably 90 mass % or more. The solvent may consist of the alkylene glycol-based solvent alone.

When the solvent contains the alkylene glycol-based solvent and an additional solvent, specific examples of the "additional solvent" include water, benzene, toluene, xylene, acetone, hexane, heptane, chlorobenzene, methanol, ethanol, n-propanol, isopropanol, butanol, pentanol, hexanol, heptanol, octanol, N-methyl-2-pyrrolidone, N,N-dimethylacetamide, N,N-diethylacetamide, N,N-dimethylformamide, N,N-diethylformamide, N-methylcaprolactam, hexamethylphosphoramide, tetramethylene sulfone, dimethylsulfoxide, o-cresol, m-cresol, p-cresol, phenol, p-chlorophenol, 2-chloro-4-hydroxytoluene, diglyme, triglyme, tetraglyme, dioxane, γ-butyrolactone, dioxolane, cyclohexanone, cyclopentanone, dichloromethane, chloroform, 1,2-dichloroethane, 1,1,2-trichloroethane, dibromomethane, tribromomethane, 1,2-dibromoethane, and 1,1,2-tribromoethane. These solvents may each be used alone, or two or more solvents selected from them may be used in combination.

Preferred examples of the method for producing the polyimide resin (A) include a method which involves separately preparing (a) a solution containing the tetracarboxylic acid component in a solvent containing the alkylene glycol-based solvent and (b) a solution containing the diamine component in a solvent containing the alkylene glycol-based solvent, then adding the solution (b) to the solution (a) or adding the solution (a) to the solution (b), thereby preparing (c) a solution containing a polyamic acid, and subsequently imidizing the polyamic acid as well as depositing a polyimide resin powder in the solution (c) by the heating of the solution (c), thereby synthesizing a polyimide resin (A).

While the reaction of the tetracarboxylic acid component with the diamine component can be performed either under normal pressure or under pressure, the reaction is preferably performed under normal pressure because no pressure resistant container is required under normal pressure.

When the end capping agent is used, it is preferable to mix the solution (a) and the solution (b), mix the end capping agent with the mixed solution to prepare the solution (c) containing a polyamic acid, and subsequently heat the solution (c), and it is more preferable to add the end capping agent after completion of addition of the solution (b) to the solution (a), to prepare the solution (c) containing a polyamic acid, and subsequently heat the solution (c).

In the method for producing the polyimide resin (A), preferably, the tetracarboxylic acid component contains a tetracarboxylic dianhydride; the step of reacting the tetracarboxylic acid component with the diamine component includes: step (i) of adding (b) a solution containing the diamine component and the alkylene glycol-based solvent to (a) a solution containing the tetracarboxylic acid component and the alkylene glycol-based solvent, thereby preparing (c) a solution containing a polyamic acid; and step (ii) of imidizing the polyamic acid as well as depositing a polyimide resin powder in the solution (c) by the heating of the solution (c), thereby providing a polyimide resin powder; and in the step (i), the solution (b) is added to the solution (a) such that the amount of the diamine component added per unit time with respect to 1 mol of the tetracarboxylic acid component is 0.1 mol/min or less, in consideration of reduction in the amount of by-products in the polyimide resin (A).

<Polyether Ketone Resin (B)>

The resin molded article of the present invention contains the polyimide resin (A) and a polyether ketone resin (B). By compounding the polyimide resin (A) having a weight average molecular weight in the predetermined range and a polyether ketone resin (B), which is a thermoplastic resin, a microphase-separated structure is easily formed in the obtained resin molded article, and HDT particularly under a low load environment can be enhanced. Further, excellent heat resistance derived from the polyether ketone resin (B) is also imparted.

Examples of the polyether ketone resin (B) include a polyether ether ketone resin (PEEK), a polyether ketone resin (PEK), a polyether ketone ketone resin (PEKK), a polyether ether ether ketone resin (PEEEK), a polyether ether ketone ketone resin (PEEKK), a polyether ketone ether ketone ketone resin (PEKEKK), a polyether ketone ketone ketone resin (PEKKK), and the like. These may be used alone or in combination of two or more thereof.

Among those described above, in consideration of enhancing the HDT of the resin molded article under a low load environment, the polyether ketone resin (B) is preferably at least one selected from the group consisting of a polyether ether ketone resin, a polyether ketone resin, a polyether ketone ketone resin, a polyether ether ether ketone resin, and a polyether ether ketone ketone resin, and more preferably a polyether ether ketone resin.

Among the polyether ether ketone resins, an aromatic polyether ether ketone resin having a repeating structural unit represented by the following formula (i) is preferable in consideration of enhancing heat resistance and HDT under a low load environment:

(i)

wherein Ar and Ar' represent an arylene group. Ar and Ar' may be the same or different from each other.

In the formula (i), Ar and Ar' are preferably arylene groups having from 6 to 12 carbon atoms, more preferably at least one selected from the group consisting of a phenylene group and a biphenylene group, and further preferably a phenylene group.

The weight average molecular weight Mw of the polyether ketone resin (B) is not particularly limited as long as it is in a range in which a microphase-separated structure can be formed with the polyimide resin (A). Usually, the weight average molecular weight Mw is in the range of 1,000 to 2,000,000, preferably 2,000 to 1,000,000, and more preferably 3,000 to 500,000. The weight average molecular weight Mw of the polyether ketone resin (B) can be measured by GPC using 1-chloronaphthalene as the mobile phase solvent.

The method for producing the polyether ketone resin (B) is not particularly limited, and a known method can be used. For example, an aromatic polyether ether ketone resin having a repeating structural unit represented by formula (i) can be produced by performing a polycondensation reaction between, for example, is a 4,4'-dihalobenzophenone represented by the following formula (ii) and a hydroquinone represented by the following formula (iii) in a solvent such as sulfolane or diphenyl sulfone in the presence of a base:

(ii)

(iii)

wherein Ar and Ar' are the same as described above; Z represents a halogen atom; R represents a hydrogen atom, R'—, R'C(O)—, R'OC(O)—, R'$_3$Si—, or R'$_2$NC(O)—; and R' represents an alkyl group having from 1 to 12 carbon atoms, an aryl group having from 6 to 12 carbon atoms, or an aralkyl group having from 7 to 12 carbon atoms.

Examples of the 4,4'-dihalobenzophenones represented by the formula (ii) include 4,4'-difluorobenzophenone and 4,4'-dichlorobenzophenone, and 4,4'-difluorobenzophenone is preferable. The hydroquinone represented by the formula (iii) is preferably p-hydroquinone in which Ar represents a p-phenylene group and R represents a hydrogen atom.

The type of the group introduced at the end and the molecular weight can be adjusted by adjusting the molar ratio between the 4,4'-dihalobenzophenone and the hydroquinone. For example, when the number of moles of the 4,4'-dihalobenzophenones is higher, a halogen atom is introduced at the end, and when the number of moles of the hydroquinone is higher, an —OR group is introduced at the end. The closer the molar ratio between the 4,4'-dihalobenzophenones and the hydroquinones is to 1:1, the higher the molecular weight of the polymer.

The polymerization reaction between the 4,4'-dihalobenzophenone and the hydroquinone is carried out by polycondensation based on a nucleophilic substitution reaction with a base.

Examples of the base include alkali metal carbonates such as lithium carbonate, sodium carbonate, potassium carbonate, rubidium carbonate, and cesium carbonate; alkali metal hydrogen carbonates such as lithium hydrogen carbonate, sodium hydrogen carbonate, potassium hydrogen carbonate, rubidium hydrogen carbonate, and cesium carbonate, alkali metal hydroxides such as lithium hydroxide, sodium hydroxide, potassium hydroxide, rubidium hydroxide, and cesium hydroxide, alkylated lithium, a lithium aluminum halide, lithium diisopropylamide, lithium bis(trimethylsilyl) amide, sodium hydride, sodium alkoxide, potassium alkoxide, a phosphazene base, a Verkade base, and the like. One of the above-described bases may be used alone, or two or more thereof may be used in combination.

The amount of the base to be used is preferably, a larger amount in the range of 30 mol % or less, more preferably a larger amount in the range of 10 mol % or less, and further preferably a larger amount in the range of 1 to 5 mol % with respect to the hydroquinone.

The polycondensation reaction is preferably carried out in a solvent. As the solvent, for example, at least one selected from the group consisting of sulfolane and diphenyl sulfone is preferable. The amount of the solvent to be used is usually such that the solid content of the reaction system is 90 mass % or less, preferably 50 mass % or less, and more preferably 15 to 30 mass %.

The temperature during the polycondensation reaction may be the reflux temperature or less. For example, when sulfolane is used as the solvent, the temperature during the polycondensation reaction is usually lower than 300° C., preferably from 200 to 280° C., and more preferably from 230 to 260° C. When diphenyl sulfone is used as the solvent, the temperature is usually 300° C. or more, and preferably from 320 to 340° C. The reaction proceeds efficiently by maintaining these temperatures.

The reaction time is not particularly limited, and may be appropriately set in consideration of the desired viscosity or molecular weight, but is usually 24 hours or less, preferably 12 hours or less, and more preferably 6 hours or less.

A commercially available product can also be used as the polyether ketone resin (B). Examples of commercially available polyether ketone resins include "PEEK 90G, 90P, 150G, 151G, 150P, 381G, 450G, 450P" produced by Victrex plc; "VESTAKEEP" produced by Daicel-Evonik Ltd.; "Kita Spire" produced by SolVay; "KEPSTAN" produced by Arkema S. A.; "TPS PEEK" produced by Toray Plastics Precision Co., Ltd.; "ZYPEEK" produced by Jilin Zhongyan High Performance Plastic Co., Ltd., and the like.

The mass ratio (A/B) of the polyimide resin (A) and the polyether ketone resin (B) in the resin molded article is preferably in the range of 1/99 to 99/1, more preferably 5/95 to 95/5, further preferably 10/90 to 90/10, and still further preferably 15/85 to 85/15. Within this range, the polyimide resin (A) and the polyether ketone resin (B) tend to form a microphase-separated structure.

The range where the HDT enhancement effect under a low load environment is particularly excellent is when the mass ratio (A/B) of the polyimide resin (A) and the polyether ketone resin (B) in the resin molded article is in the range of 1/99 to 50/50, preferably 5/95 to 40/60, and more preferably 10/90 to 35/65.

In the resin molded article, the total content of the polyimide resin (A) and the polyether ketone resin (B) in the resin molded article is preferably 70 mass % or more, more preferably 80 mass % or more, and further preferably 90 mass % or more, in consideration of obtaining the effects of the present invention. The upper limit is 100 mass %.

<Additive>

The resin molded article of the present invention may contain additives as required, such as a filler, a delusterant, a nucleating agent, a plasticizer, an antistatic agent, an anti-coloring agent, an anti-gelling agent, a flame retardant, a colorant, a slidability-improving agent, an antioxidant, a conducting agent, and a resin-modifying agent.

The content of the additive is not particularly limited, but in consideration of exerting the effects of the additive while maintaining the physical properties derived from the polyimide resin (A) and the polyether ketone resin (B), the content is usually, of the resin molded article, 50 mass % or less, preferably 0.0001 to 30 mass %, more preferably 0.0001 to 15 mass %, further preferably 0.001 to 10 mass %, and still further preferably 0.01 to 8 mass %.

<Microphase-Separated Structure>

The resin molded article of the present invention has a microphase-separated structure. The microphase-separated structure is mainly formed by phase separation of the polyimide resin (A) and the polyether ketone resin (B), and may be a sea-island structure or a co-continuous structure, but a sea-island structure is preferable.

In the sea-island structure, any one of the components may form the "sea" depending on the mass ratio between the polyimide resin (A) and the polyether ketone resin (B) in the resin molded article. When the polyether ketone resin (B) forms the "sea", the HDT enhancement effect under a low load environment is better.

The formation of the microphase-separated structure can be adjusted based on the structure and weight average molecular weight of the polyimide resin (A), the type and weight average molecular weight of the polyether ketone resin (B), the mass ratio between the polyimide resin (A) and the polyether ketone resin (B), and the selection of the combination thereof. Whether the resin molded article has a microphase-separated structure can be determined by, for example, observing the surface or a cross section of the resin molded article with a scanning transmission electron microscope (STEM).

<Heat Deformation Temperature (HDT)>

The resin molded article of the present invention has a high HDT particularly under a low load environment, and is therefore suited to applications employing products to be used under a low load environment and requiring heat resistance.

In consideration of this, for a resin molded article of 80 mm×10 mm×4 mm in thickness, the HDT measured under conditions of a load of 0.45 MPa and a heating rate of 120° C./hour according to JIS K7191-1, 2:2015, is preferably 200° C. or more, more preferably 220° C. or more, and further preferably 240° C. or more. The upper limit of the HDT is not particularly limited, but is usually a temperature equal to or less than the melting point, for example, 350° C. or less, and preferably 300° C. or less. The HDT of the resin molded article can be specifically measured by the method described in the examples.

[Method for Producing Resin Molded Article]

Since the polyimide resin (A) and the polyether ketone resin (B) contained in the resin molded article of the present invention have thermoplasticity, the resin molded article can be easily produced by heat-molding a resin composition containing the polyimide resin (A) and the polyether ketone resin (B).

Examples of the heat-molding method include injection molding, extrusion molding, blow molding, heat press molding, vacuum molding, pneumatic molding, laser molding, ultrasound heat-molding, welding, and heat adhesion, and the like, and molding may be carried out by any molding method that includes a heat melting step. Heat molding is preferable because molding is enabled without setting the molding temperature to an elevated temperature more than 400° C., for example. Among these, injection molding is preferably performed because such molding can be performed without the molding temperature and the mold temperature in molding being set at high temperatures. For example, injection molding can be performed at a molding temperature of preferably 400° C. or less and more preferably 360° C. or less and a mold temperature of preferably 260° C. or less and more preferably 220° C. or less.

The method for producing the resin molded article of the present invention preferably includes the step of heat-molding a resin composition containing the polyimide resin (A) and the polyether ketone resin (B) at from 290 to 350° C. Examples of the specific procedure include the following methods.

First, the polyimide resin (A), the polyether ketone resin (B), and the various arbitrary components are, if necessary, added and dry blended, then introduced into an extruder, and melt-kneaded and extruded in the extruder preferably at from 290 to 350° C., thereby producing pellets. Alternatively, the polyimide resin (A) may be introduced into the extruder and molten preferably at from 290 to 350° C., and the polyether ketone resin (B) and the various arbitrary components, if necessary, may be introduced into the extruder, and melt-kneaded and extruded in the extruder with the polyimide resin (A), thereby producing the pellets.

The pellets may be dried, then introduced in various kinds of molding machines, and heat-molded preferably at from 290 to 350° C., thereby producing a resin molded article having a desired shape. The temperature during the heat-molding is preferably at from 310 to 350° C.

<Applications>

The resin molded article of the present invention has a high heat deformation temperature particularly under a low load environment and is excellent in heat resistance, and therefore can be applied in, for example, speaker diaphragms, protective covers, transportation cassettes, test sockets, UD tapes, CFRP members, and the like.

EXAMPLES

The present invention will be described in more detail with reference to examples below, but the present invention is not limited thereto. Various measurements and evaluations in each Production Example, Example, and Reference Example were carried out in the following manners.

<Infrared Spectroscopy (IR Measurement)>

The IR measurement of the polyimide resin was performed with "JIR-WINSPEC 50", produced by JEOL, Ltd.

<Logarithmic Viscosity μ>

The polyimide resin was dried at from 190 to 200° C. for 2 hours, and then 0.100 g of the polyimide resin was dissolved in 20 mL of concentrated sulfuric acid (96%, produced by Kanto Chemical Co., Inc.) to form a polyimide resin solution, and the measurement was made at 30° C. with a Cannon-Fenske viscometer using the polyimide resin solution as a measurement sample. The logarithmic viscosity μ was obtained according to the following expression.

$\mu = \ln(t_s/t_0)/C$ $t_0$: elapsed time for flowing concentrated sulfuric acid
$t_s$: elapsed time for flowing polyimide resin solution
C: 0.5 g/dL <Melting Point, Glass Transition Temperature, Crystallization Temperature, and Exothermic Amount of Crystallization>

The melting point Tm, the glass transition temperature Tg, the crystallization temperature Tc, and the exothermic amount of crystallization ΔHm of the polyimide resin or resin molded article produced in each of the Examples were measured with a differential scanning calorimeter ("DSC-6220", produced by SII Nanotechnology, Inc.).

The polyimide resin or resin molded article was subjected to the following thermal history in a nitrogen atmosphere. The condition of the thermal history included the first heating (heating rate: 10° C./min), then cooling (cooling rate: 20° C./min), and then second heating (heating rate: 10° C./min).

The melting point (Tm) was determined by reading the peak top value of the endothermic peak observed in the second heating. The glass transition temperature (Tg) was determined by reading the value observed in the second heating. The crystallization temperature (Tc) was determined by reading the peak top value of the exothermic peak observed in cooling. Regarding Tm, Tg, and Tc, when a plurality of peaks were observed, the peak top value of each peak was read.

The exothermic amount of crystallization ΔHm (mJ/mg) was calculated from the area of the exothermic peak observed in cooling.

<Crystallization Half-Time>

The crystallization half-time of the polyimide resin was measured with a differential scanning calorimeter ("DSC-6220", produced by SII Nanotechnology, Inc.).

A polyimide resin having a crystallization half-time of 20 seconds or less was measured under such conditions that in a nitrogen atmosphere, the polyimide resin was held at 420° C. for 10 minutes for melting the polyimide resin completely, and then quenched at a cooling rate of 70° C./min, during which the time required from the appearance of the crystallization peak observed to the peak top thereof was calculated for determining the crystallization half-time.

<Weight Average Molecular Weight>

The weight average molecular weight (Mw) of the polyimide resin was measured with a gel permeation chromatography (GPC) measurement apparatus "Shodex GPC-101" produced by Showa Denko K.K. under the following conditions:

Column: Shodex HFIP-806M
Mobile phase solvent: HFIP containing 2 mM sodium trifluoroacetate
Column temperature: 40° C.
Flow rate of mobile phase: 1.0 mL/min
Specimen concentration: about 0.1 mass %
Detector: IR detector
Amount of injection: 100 μm
Calibration curve: standard PMMA <Heat Deformation Temperature (HDT)>

The polyimide resin was used for measurement. Alternatively, the polyimide resin composition obtained in each of the Examples was used to produce a resin molded article of 80 mm×10 mm×4 mm in thickness, which was used for measurement.

For the measurement, a flatwise test was conducted according to JIS K7191-1, 2:2015. A HDT tester "Auto-HDT3D-2" (produced by Toyo Seiki Seisaku-sho, Ltd.) was used to measure the heat deformation temperature under conditions of a distance between supports of 64 mm, a load of 1.80 MPa (high load) and 0.45 MPA (low load), and a heating rate of 120° C./hour.

<Presence/Absence of Microphase-Separated Structure>

The resin molded article produced in each of the Examples was cut and made smooth using a microtome ("ULTRACUT E" manufactured by REICHERT-JUNGLIMITED), and then stained with a ruthenium-based dye. The cut surface was observed with a scanning transmission electron microscope ("SU8020" manufactured by Hitachi High-Technologies Corporation) at an accelerating voltage of 30.0 kV and an observation magnification of 30,000 times to evaluate the presence or absence of a microphase-separated structure. As described later, in all of the resin molded articles produced in the Examples, the microphase-separated structure was a sea-island structure.

<Bending Strength and Flexural Modulus>

The polyimide resin composition obtained in each of Reference Examples 7 to 13 was used to prepare a molded article of 80 mm×10 mm×4 mm in thickness prescribed in ISO 316, which was used for measurement. The bending test was performed with Bend Graph (produced by Toyo Seiki Seisaku-Sho, Ltd.) according to ISO 178 at a temperature of 23° C. and a testing speed of 2 mm/min to measure the bending strength and the flexural modulus.

[Production Example 1] Production of Polyimide Resin 1

500 g of 2-(2-methoxyethoxy)ethanol (produced by Nippon Nyukazai Co., Ltd.) and 218.12 g (1.00 mol) of pyromellitic dianhydride (produced by Mitsubishi Gas Chemical Company, Inc.) were introduced in a 2 L separable flask equipped with a Dean-Stark apparatus, a Liebig condenser tube, a thermocouple, and a four-paddle blade. After creation of a nitrogen flow, the mixture was agitated at 150 rpm so as to become a homogeneous suspended solution. On the other hand, 49.79 g (0.35 mol) of 1,3-bis(aminomethyl)cyclohexane (produced by Mitsubishi Gas Chemical Company, Inc., cis/trans ratio=7/3) and 93.77 g (0.65 mol) of 1,8-octamethylenediamine (produced by Kanto Chemical Co., Inc.) were dissolved in 250 g of 2-(2-methoxyethoxy)ethanol with a 500 mL beaker, thereby preparing a mixed diamine solution. This mixed diamine solution was added gradually with a plunger pump. Heat was generated due to the drop addition, but the internal temperature was adjusted to be within the range of 40 to 80° C. The dropwise addition of the mixed diamine solution was carried out in a nitrogen flow state over the whole period. The number of rotations of the agitation blade was set to 250 rpm. After the completion of the dropwise addition, 130 g of 2-(2-methoxyethoxy)ethanol and 1.284 g (0.0100 mol) of n-octylamine (produced by Kanto Chemical Co., Inc.) as an end capping agent were added thereto, and the mixture was further agitated. At this stage, a pale yellow polyamic acid solution was obtained. Next, the agitation speed was set to 200 rpm, and the polyamic acid solution in the 2 L separable flask was then heated to 190° C. In this heating process, the deposition of a polyimide resin powder and dehydration associated with imidization were confirmed at a solution temperature of from 120 to 140° C. The solution was kept at 190° C. for 30 minutes, then allowed to cool to room temperature, and filtered. The obtained polyimide resin powder was washed with 300 g of 2-(2-methoxyethoxy)ethanol and 300 g of methanol, filtered, and then dried at 180° C. for 10 hours with a drier, thereby providing 317 g of a powder of polyimide resin 1.

The measurement of the IR spectrum of polyimide resin 1 showed the characteristic absorption of an imide ring ν(C=O) observed at 1768 and 1697 (cm$^{-1}$). The logarithmic viscosity was 1.30 dL/g, Tm was 323° C., Tg was 184° C., Tc was 266° C., the exothermic amount of crystallization was 21.0 mJ/mg, the crystallization half-time was 20 seconds or less, and Mw was 55,000.

The composition and evaluation results of the polyimide resin in Production Example 1 are shown in Table 1. The values expressed in mol % of the tetracarboxylic acid component and the diamine component in Table 1 are values calculated from the charged amount of each component in production of the polyimide resin.

Example 1 (Production and Evaluation of Resin Molded Article)

The polyimide resin 1 obtained in Production Example 1 and the polyether ether ketone resin (PEEK) ("PEEK 90G", produced by Victrex plc) were dry blended in the ratio shown in Table 2, and then melt-kneaded using a twin-screw kneading extruder ("HK-25D", produced by Parker Corporation) at a barrel temperature of 350° C. and a screw rotation speed of 150 rpm to obtain a resin composition.

The obtained resin composition was injection molded at a barrel temperature of 350° C. and a mold temperature of 195° C. with an injection molding machine ("ROBOSHOT α-S30iA", produced by FANUC Corporation), thereby producing a resin molded article consisting of a polyimide resin/PEEK resin. Using the produced resin molded article, various evaluations were carried out by the methods described above. The results are shown in Table 2.

Examples 2 to 4 and Comparative Examples 1 and 2

Resin molded articles were produced according to the same method as in Example 1, except that the resin compositions constituting the resin molded articles were changed as shown in Table 2. Using the produced resin molded articles, various evaluations were carried out by the methods described above. The results are shown in Table 2.

FIGS. 1 to 4 are photomicrographs of the resin molded articles of each of Examples 1 to 4 observed by a scanning transmission electron microscope (STEM) by the method described above. All of these resin molded articles were observed as having a sea-island structure. In the resin molded article of FIG. 1 (Example 1), the sea part of the sea-island structure is the polyimide resin, and the island part is the PEEK resin. In the resin molded articles of FIGS. 2 to 4 (Examples 2 to 4), the sea part of the sea-island structure is the PEEK resin and the island part is the polyimide resin.

Figure 1:
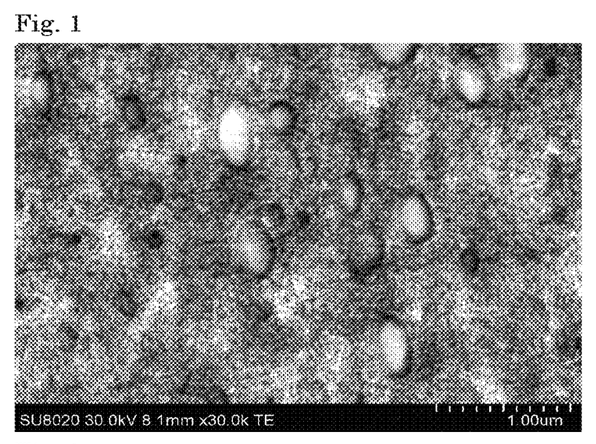
FIG. 1 is a photomicrograph of a resin molded article of Example 1 observed with a scanning transmission electron microscope (STEM).
Figure 2:
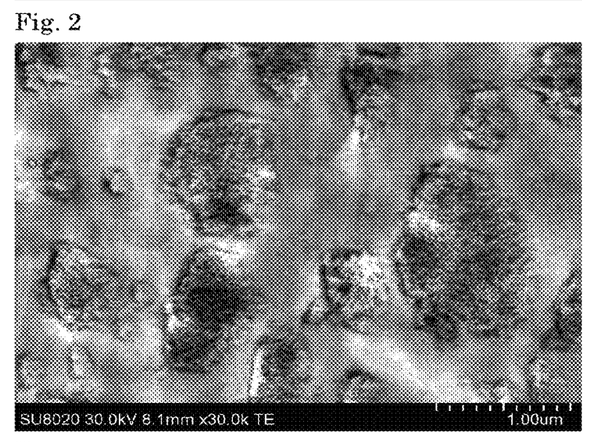
FIG. 2 is a photomicrograph of a resin molded article of Example 2 observed with a STEM.
Figure 3:
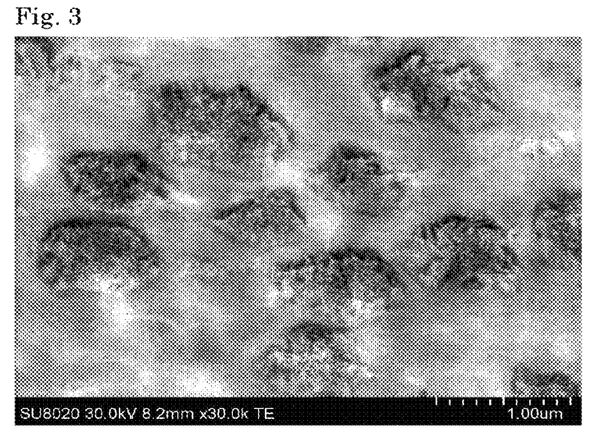
FIG. 3 is a photomicrograph of a resin molded article of Example 3 observed with a STEM.
Figure 4:
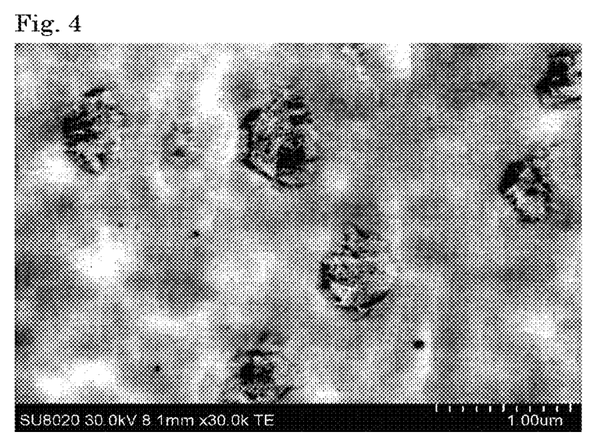
FIG. 4 is a photomicrograph of a resin molded article of Example 4 observed with a STEM.
Figure 5:
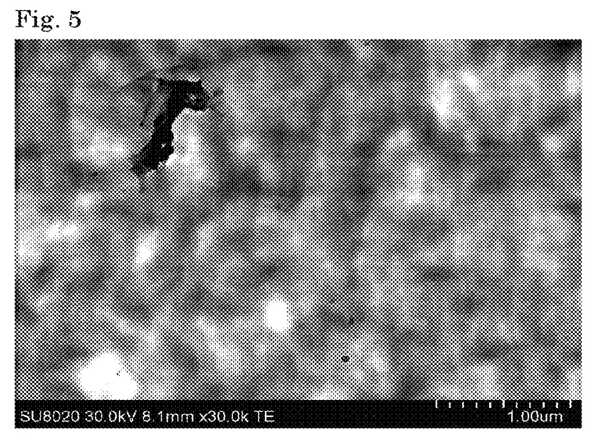
FIG. 5 is a photomicrograph of a resin molded article of Comparative Example 1 observed with a STEM.
Figure 6:
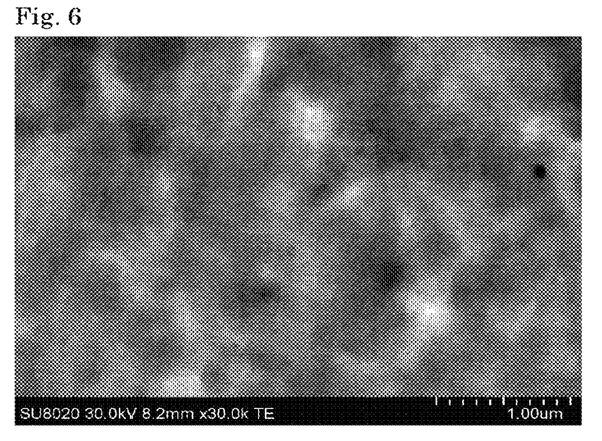
FIG. 6 is a photomicrograph of a resin molded article of Comparative Example 2 observed with a STEM.

FIGS. 5 and 6 are photomicrographs of the resin molded articles of Comparative Examples 1 and 2 observed by a STEM by the method described above, and in those resin molded articles no microphase-separated structure was observed.

Reference Examples 1 to 6

Resin molded articles were produced according to the same method as in Example 1, except that the resin com-

TABLE 1

| | | Tetracarboxylic acid component (mol % in the total tetracarboxylic acid component) | Diamine component (mol % in the total diamine component) | | (1)/{(1) + (2)} | Tm | Tg | Tc | Exothermic amount of crystallization ΔHm | Crystallization half-time | |
|---|---|---|---|---|---|---|---|---|---|---|---|
| | | PMDA | 1,3-BAC | OMDA | (mol%) | (° C.) | (° C.) | (° C.) | (mJ/mg) | (second) | Mw |
| Production Example 1 | Polyimide resin 1 | 100 | 35 | 65 | 35 | 323 | 184 | 266 | 21.0 | <20 | 55,000 |

Abbreviations in the Table 1 are as Follows.

PMDA; pyromellitic dianhydride 1,3-BAC; 1,3-bis(aminomethyl)cyclohexane

OMDA; 1,8-octamethylenediamine positions constituting the resin molded articles were changed as shown in Table 2. Using the produced resin molded articles, various evaluations were carried out by the methods described above. The results are shown in Table 2. The resin molded articles having a "yes" in the sea-island structure row for the reference examples in Table 2 were observed as having a similar sea-island structure to that of the photographs of FIGS. 1 to 4.

Reference Examples 7 to 13

Resin molded articles were produced according to the same method as in Example 1, except that the resin compositions constituting the resin molded articles were changed as shown in Table 3. Using the produced resin molded articles, various evaluations were carried out. The results are shown in Table 3. The resin molded articles having a "yes" in the sea-island structure row for the reference examples in Table 3 were observed as having a similar sea-island structure to that of the photographs of FIGS. 1 to 4.

(b2) ULTEM: Polyether imide resin, "ULTEM 1000", produced by SABIC Innovative Plastics Co., Ltd.

Figure 7:
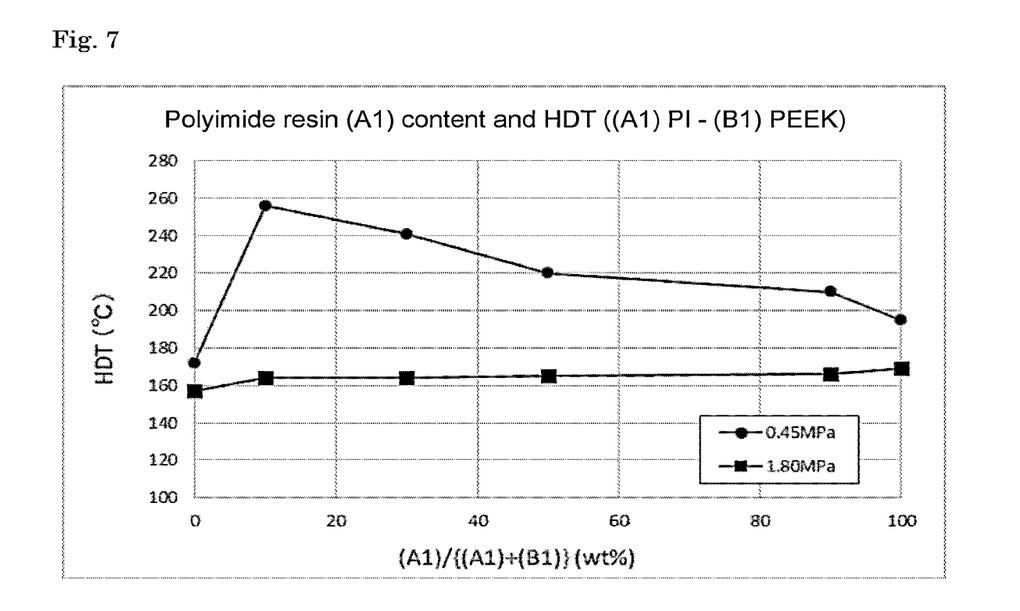
FIG. 7 is a graph plotting a correlation between, for a resin molded article containing (A1) polyimide resin 1 and (B1) a polyether ether ketone resin (PEEK), the content of (A1) with respect to the total content of (A1) and (B1), and HDT.
Figure 8:
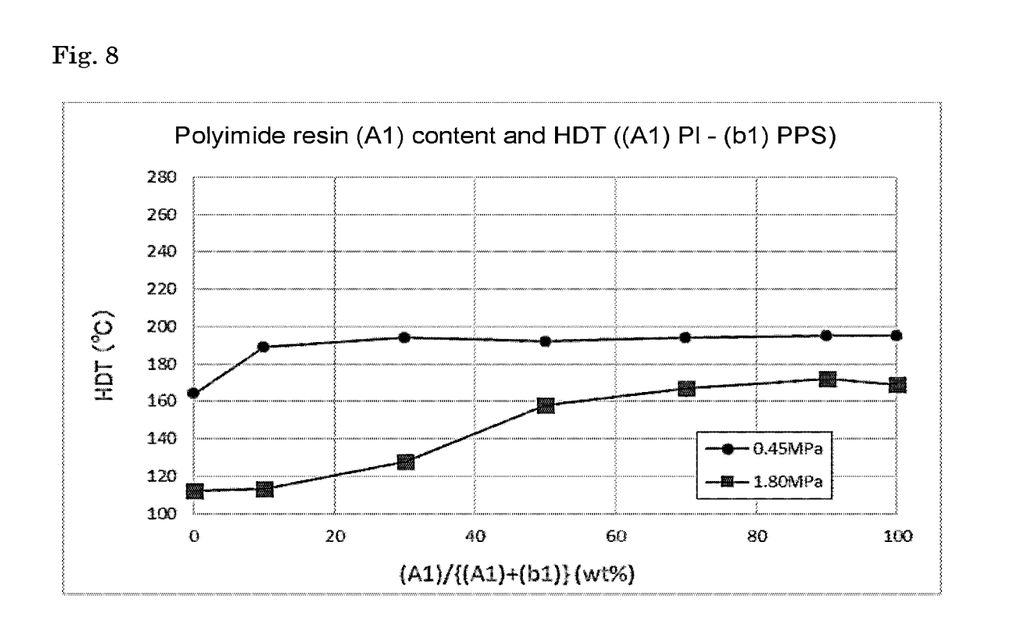
FIG. 8 is a graph plotting a correlation between, for a resin molded article containing (A1) polyimide resin 1 and (b1) a polyphenylene sulfide resin (PPS), the content of (A1) with respect to the total content of (A1) and (b1), and HDT.
Figure 9:
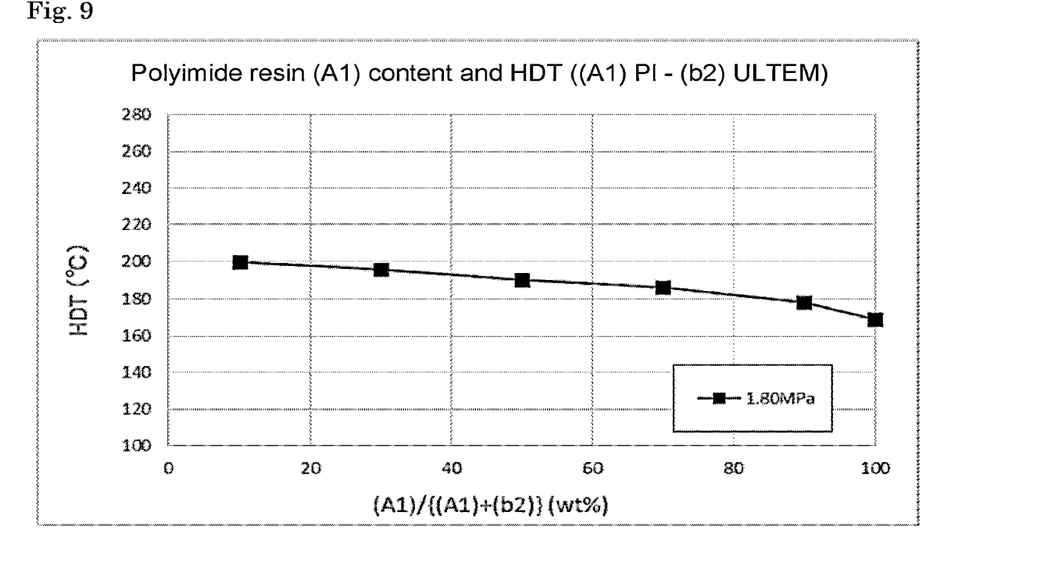
FIG. 9 is a graph plotting a correlation between, for a resin molded article containing (A1) polyimide resin 1 and (b2) a polyether imide resin (ULTEM), the content of (A1) with respect to the total content of (A1) and (b2), and HDT.

Based on the results of Table 2, in FIG. 7, for a resin molded article containing (A1) polyimide resin 1 and (B1) PEEK, the correlation between the content (mass %) of (A1) with respect to the total content of (A1) and (B1), and HDT (high load: 1.80 MPa and low load: 0.45 MPa) of the resin molded article is plotted. In FIG. 8, for a resin molded article using (b1) PPS instead of (B1) PEEK, the content (mass %) of (A1) with respect to the total content of (A1) and (b1), and the HDT (high load: 1.80 MPa and low load: 0.45 MPa) of the resin molded article is plotted. In FIG. 9, for a resin molded article using (b2) ULTEM instead of (B1) PEEK, the content (mass %) of (A1) with respect to the total content of (A1) and (b2), and the HDT (high load: 1.80 MPa) of the resin molded article is plotted.

TABLE 2

| | | | Comp. Ex. | Example | | | | Comp. Ex. | Reference Example | | | | | |
|---|---|---|---|---|---|---|---|---|---|---|---|---|---|---|
| | | | 1 | 1 | 2 | 3 | 4 | 2 | 1 | 2 | 3 | 4 | 5 | 6 |
| Resin composition (parts by mass) | (A1) Polyimide resin 1 | | 100 | 90 | 50 | 30 | 10 | 0 | 90 | 70 | 50 | 30 | 10 | 0 |
| | (B1) PEEK | | 0 | 10 | 50 | 70 | 90 | 100 | 0 | 0 | 0 | 0 | 0 | 0 |
| | (b1) PPS | | 0 | 0 | 0 | 0 | 0 | 0 | 10 | 30 | 50 | 70 | 90 | 100 |
| Microphase-separated (sea-island) structure | | | no | yes | yes | yes | yes | no | yes | yes | yes | yes | yes | no |
| Physical properties | Tm | °C. | 323 | 325 | 343, 326 | 346, 328 | 345 | 343 | 324 | 325, 281 | 323, 282 | 323, 282 | 322, 282 | 278 |
| | Tg | °C. | 184 | 189 | 160 | 156 | 152 | 154 | 184 | 187 | 183 | 178, 91 | 91 | 88 |
| | Tc | °C. | 266 | 268 | 293, 270 | 294, 277 | 297 | 291 | 268 | 291, 225 | 292, 227 | 298, 227 | 228 | 228 |
| | ΔHm | mJ/mg | 21 | 19 | 27 | 30 | 34 | 32 | 20 | 20 | 27 | 27 | 30 | 32 |
| HDT | High load (1.80 MPa) | °C. | 169 | 166 | 165 | 164 | 164 | 157 | 172 | 167 | 158 | 128 | 113 | 112 |
| | Low load (0.45 MPa) | °C. | 195 | 210 | 220 | 241 | 256 | 172 | 195 | 194 | 192 | 194 | 189 | 164 |

TABLE 3

| | | | Reference Example | | | | | | |
|---|---|---|---|---|---|---|---|---|---|
| | | | 7 | 8 | 9 | 10 | 11 | 12 | 13 |
| Resin composition (parts by mass) | (A1) Polyimide resin 1 | | 100 | 90 | 70 | 50 | 30 | 10 | 0 |
| | (B1) PEEK | | 0 | 0 | 0 | 0 | 0 | 0 | 0 |
| | (b2) ULTEM | | 0 | 10 | 30 | 50 | 70 | 90 | 100 |
| Microphase-separated (sea-island) structure | | | no | yes | yes | yes | yes | yes | no |
| Physical properties | Tm | °C. | 324 | 322 | 322 | 323 | 322 | 313 | — |
| | Tg | °C. | 184 | 186 | 193 | 211 | 212 | 215 | 216 |
| | Tc | °C. | 269 | 269 | 265 | 263 | 262 | 244 | — |
| | ΔHm | mJ/mg | 20 | 20 | 14 | 5 | 5 | 1 | — |
| HDT | High load (1.80 MPa) | °C. | 169 | 178 | 186 | 190 | 196 | 200 | 202 |
| | Low load (0.45 MPa) | °C. | — | — | — | — | — | — | — |
| Mechanical properties | Bending strength | MPa | 113 | 120 | 128 | 134 | 139 | 143 | 147 |
| | Flexural modulus | GPa | 2.4 | 2.4 | 2.5 | 2.7 | 2.9 | 3.2 | 3.3 |

The details of each components shown in Tables 2 and 3 are as follows.

<Polyimide Resin (A)>
 (A1) Polyimide resin 1 obtained in Production Example 1, Mw: 55,000
<Polyether Ketone Resin (B)>
 (B1) PEEK: Polyether ether ketone resin, "PEEK 90G", produced by Victrex plc
<Thermoplastic Resin Other than (B)>
 (b1) PPS: Polyphenylene sulfide resin, "Torelina A900", produced by Toray Industries, Inc.

From Tables 2 and 3 and FIGS. 7 to 9, the following can be understood.

As shown in Table 2, the resin molded articles of Examples 1 to 4, which contained the predetermined polyimide resin (A) and PEEK as the polyether ketone resin (B) and had a microphase-separated (sea-island) structure, had a better low load (0.45 MPa) HDT than the resin molded article of Comparative Example 1, which consists only of the polyimide resin (A), and the resin molded article of Comparative Example 2, which consists only of PEEK. As shown in FIG. 7, the HDT under a low load behaved differently from the HDT under a high load (1.80 MPa), from which it can be confirmed that a specific effect is exhibited. It can also be confirmed that the resin molded articles of FIGS. 2 to 4 (Examples 2 to 4), in which the polyether ketone resin (B) formed the "sea", had a better effect of enhancing the HDT during a low load (0.45 MPa) than the resin molded article of FIG. 1 (Example 1), in which the polyimide resin (A) formed the "sea".

As shown in Table 2 and FIG. 8, the resin molded articles of Reference Examples 1 to 6, which used a polyphenylene sulfide resin (PPS) instead of PEEK as the polyether ketone resin (B), only exhibited a tendency for both the low load (0.45 MPa) HDT and the high load (1.80 MPa) HDT to increase in line with an increase in the content of the polyimide resin (A), and a synergistic effect of containing both the polyimide resin (A) and the PPS could not be confirmed.

As shown in Table 3 and FIG. 9, the resin molded articles of Reference Examples 7 to 13, which used a polyether imide resin (ULTEM) instead of PEEK as the polyether ketone resin (B), only exhibited a tendency for the high load (1.80 MPa) HDT to decrease in line with an increase in the content of the polyimide resin (A), and a synergistic effect of containing both the polyimide resin (A) and the ULTEM could not be confirmed.

INDUSTRIAL APPLICABILITY

The resin molded article of the present invention has a high heat deformation temperature particularly under a low load environment and is excellent in heat resistance, and therefore can be applied in, for example, speaker diaphragms, protective covers, transportation cassettes, test sockets, UD tapes, CFRP members, and the like.

The invention claimed is:

1. A resin molded article having a microphase-separated structure, the resin molded article comprising a polyimide resin (A) and a polyether ketone-based resin (B), wherein the polyimide resin (A) comprises a repeating structural unit of the following formula (1) and a repeating structural unit of the following formula (2):

(1)

(2)

wherein $R_1$ represents a divalent group having from 6 to 22 carbon atoms comprising at least one alicyclic hydrocarbon structure; $R_2$ represents a divalent chain aliphatic group having from 5 to 16 carbon atoms; and $X_1$ and $X_2$ each independently represent a tetravalent group having from 6 to 22 carbon atoms comprising at least one aromatic ring, a content ratio of the repeating structural unit of the formula (1) with respect to a total of the repeating structural unit of the formula (1) and the repeating structural unit of the formula (2) is from 20 mol % to 70 mol %, a weight average molecular weight Mw of the polyimide resin (A) is from 45,000 to 70,000, and a mass-ratio of the polyimide resin (A) to the polyether ketone-based resin (B) (A/B) is from 5/95 to 40/60, and a resin molded article of 80 mm×10 mm×4 mm in thickness has a heat deformation temperature measured under conditions of a load of 0.45 MPa and a heating rate of 120° C./hour according to JIS K7191-1, 2:2015, of at least 220° C.

2. The resin molded article according to claim 1, wherein the content ratio of the repeating structural unit of the formula (1) with respect to the total of the repeating structural unit of the formula (1) and the repeating structural unit of the formula (2) is from 20 mol % to less than 40 mol %.

3. The resin molded article according to claim 1, wherein the polyether ketone-based resin (B) is at least one selected from the group consisting of a polyether ether ketone resin, a polyether ketone resin, a polyether ketone ketone resin, a polyether ether ether ketone resin, and a polyether ether ketone ketone resin.

4. The resin molded article according to claim 1, wherein the microphase-separated structure is a sea-island structure.

5. A method for producing the resin molded article according to claim 1, the method comprising:

injection molding a resin composition comprising the polyimide resin (A) and the polyether ketone-based resin (B).

* * * * *